Dec. 29, 1964  J. J. WALLACE  3,162,902
COTTON GIN WITH SLIDABLY MOUNTED BREASTS
Filed Feb. 21, 1961  7 Sheets-Sheet 1

Fig. 1.

INVENTOR
Jeffrey J. Wallace

BY Mason, Fenwick & Lawrence
ATTORNEYS

Dec. 29, 1964   J. J. WALLACE   3,162,902
COTTON GIN WITH SLIDABLY MOUNTED BREASTS
Filed Feb. 21, 1961   7 Sheets-Sheet 6

INVENTOR
Jeffrey J. Wallace
BY Mason, Fenwick & Lawrence
ATTORNEYS

United States Patent Office

3,162,902
Patented Dec. 29, 1964

1

3,162,902
COTTON GIN WITH SLIDABLY MOUNTED
BREASTS
Jeffrey John Wallace, Amite, La., assignor, by mesne
assignments, to John T. Gordin, J. R. Gillian, Geo.
Garrison Potts, jointly, all of Dallas, Tex.
Filed Feb. 21, 1961, Ser. No. 90,802
16 Claims. (Cl. 19—59)

This invention relates to cotton gins and this application for patent is companion to my application Serial No. 63,886, filed October 20, 1960, now abandoned, entitled Cotton Gin With Novel Hulling and Ginning Rib Construction. The latter application covers improvements in the structure of those instrumentalities which directly function in the hulling and ginning process, to increase the capacity of the gin, effecting greater efficiency and thoroughness in carrying out the hulling and ginning operation and upgrading the quality of the ginned cotton.

The present application covers the structural features of the gin which are environmental to the hulling and ginning instrumentalities and which make practical the building of larger gins than those of conventional size, which improve the means for separating the hulling and ginning breasts from the fixed component of the gin, for inspection or emergency access, which provide improved manual and automatic operational controls, precision means for adjusting the relative setting of the ribs and saws and including other features which will be disclosed as a description of the subject invention proceeds.

One of the objects of the invention is to provide a cotton gin in which the ginning and hulling breasts which respectively carry the ginning and hulling ribs, are supported upon track bars extending from the fixed component which carries the saw cylinder and which are separable as a unit therefrom and from one another for removing the ribs from operative position with respect to the saws, for dumping the roll box and for other purposes, and the hulling breast being independently separable from the ginning breast to give access to the hulling chamber and the hulling mechanism therein.

Another object of the invention is the provision of a cotton gin as described, in which the driving train from the saw cylinder to the rotatable hulling elements within the hulling breast is automatically de-clutched responsive to the separation of the breasts from the fixed component whereby the hulling elements are idle while the breasts are in inoperative position with respect to the saw cylinder.

A further object of the invention is the provision of a brake for the driven hulling elements in a cotton gin as described, which is automatically applied responsive to the separation of the breasts from the saw cylinder component for checking the momentum of the hulling elements as soon as the driving train is interrupted, avoiding the loss of seed cotton that may be already in the hulling chamber and which being out of contact with the saws, would be discharged, untreated, with the hulls and trash.

Still another object of the invention is the provision of an improved construction of saw cylinder of increased length and weight necessitated by the employment of larger diameter saws, and more of them than are customarily used, said saw cylinder being fortified against whipping or sagging and being dynamically balanced.

Another object of the invention is to provide bodily lateral adjustment of the ginning and hulling breasts relative to the rollers upon which they traverse the track bars, so as, from time to time as need requires, to adjustably regulate the spacing between the hulling and ginning ribs and the saws which lie between them.

A further object of the invention is to provide a tubular drum for the saw cylinder supporting the saws, having heads for the shaft bearings offset inwardly from the ends of said drum defining chambers within said drum outwardly of said heads, the cylindrical walls of which afford faces to which dynamic balance weights may be adjustably secured.

Another object of the invention is to provide a gin as described, of the blast doffer type in which an air pressure chamber is provided cooperating with the saw cylinder component of the gin at the rear thereof, said chamber being separable from said saw cylinder component, roller-supported by track bars, said chamber being unitary with a mote discharge duct having its mouth in proximity to the saw cylinder opposite the ginning point, the forward wall of said pressure chamber being contoured and transversely slotted to form nozzles extending across the gin when said pressure chamber is in place, respectively directed toward the mouth of said mote duct and downwardly tangentially of said saw cylinder toward the mouth of the lint flue, said forward wall being formed with a baffle positioned to direct lint toward the mouth of said lint flue.

Other objects of the invention will appear as the following description of a practical embodiment thereof proceeds.

In the drawings which accompany and form a part of the following specification,

FIGURE 5 is a fragmentary view in side elevation showing safety means for gravitationally interposing a stop between the ginning and hulling breasts to keep the breasts from closing relative to the fixed gin component while the hulling breast may be in separated relation to the ginning breast;

FIGURE 6 is a cross-sectional view taken along the line 6—6 of FIGURE 5;

FIGURE 7 is a fragmentary view in elevation of the upper part of the gin showing the relative position of the safety release and gravitational stop when the breasts are in mutually closed position but open with respect to the fixed component of the gin;

Figure 2:
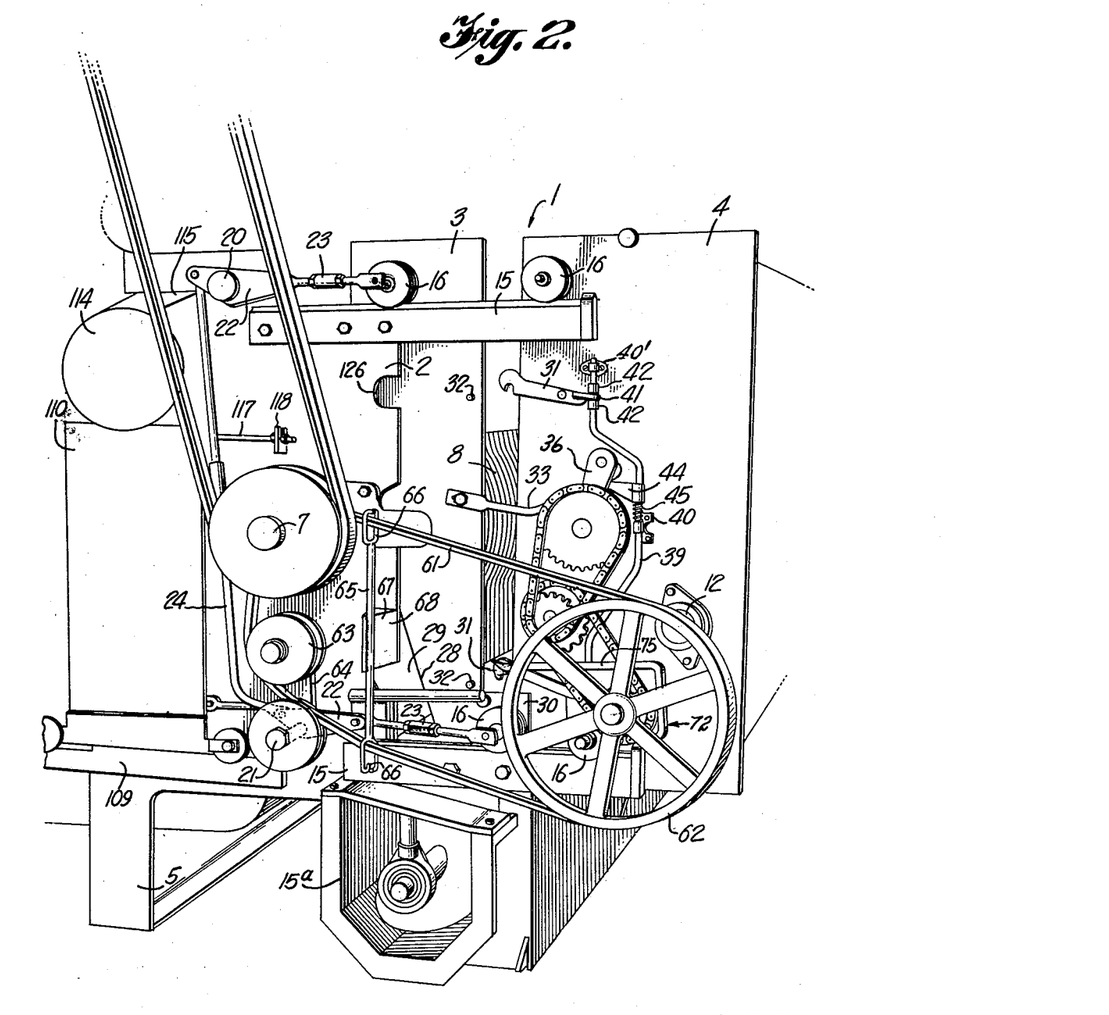
FIGURE 2 is a similar view taken from the same side of the gin, the breasts being in fully open position.
Figure 3:
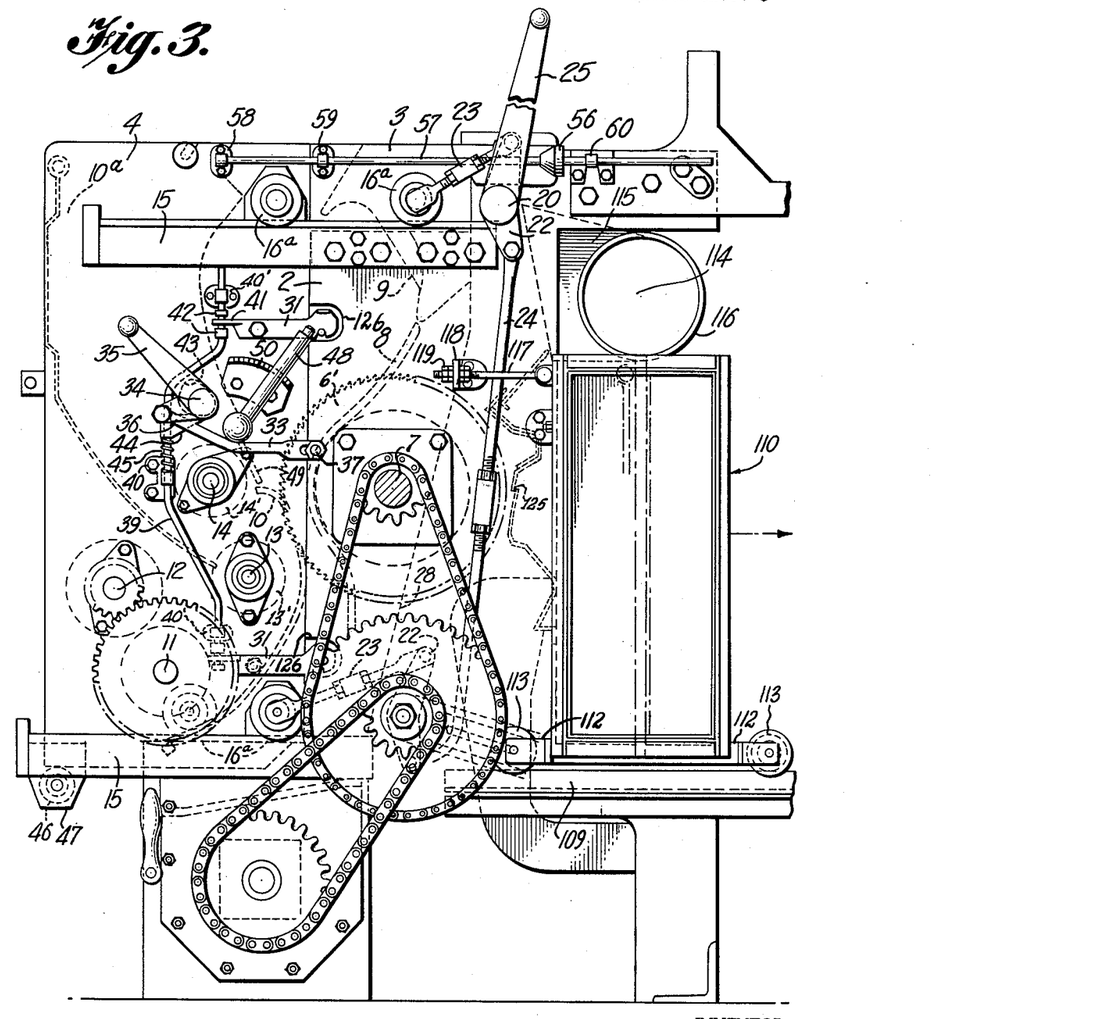
FIGURE 3 is a side elevational view of the gin, the breasts being in fully closed position, the view outlining in dotted lines the corresponding relative positions of roll box, ginning and hulling ribs, supply chute and forward face of the pressure chamber.

Referring now in detail to the drawings, the gin, represented as a whole by the reference numeral 1, comprises a casing the opposite sides of which are substantially flat, consisting of three pairs of sturdy spaced plates 2, 3 and 4 in vertical planes and serially arranged, corresponding opposite plates being substantially identical. The rearmost plates 2 are fixed with respect to the gin frame 5. The saw cylinder 6′, FIGURE 3, extends between them, its shaft 7 being supported in bearings carried by said plates. The plates 2, together with the saw cylinder and whatever else is unitary with them either on the inside or outside, are referred to herein as the saw cylinder component or, more briefly, as the fixed component. The plates 3, which are best shown in FIGURES 2 and 3, carry between them the ginning ribs 8 (see FIGURES 2 and 3) and the structure which forms one side of the roll box 9, FIGURE 3. The plates 4 support between them the hulling ribs 10 and the shafts of the several rotatable hulling instrumentalities including the shaft 11 of the reclaimer saw cylinder, shaft 12 of the doffer, and the shafts 13 and 14 of the spiked rollers 13′ and 14′, all of which are disclosed in said companion application. The plates 4 also carry between them the feed chute 10a which supplies seed cotton to the gin. The pairs of plates 3 and 4 and the structure that they carry are hereinafter generally referred to as the ginning and hulling breasts.

Figure 1:
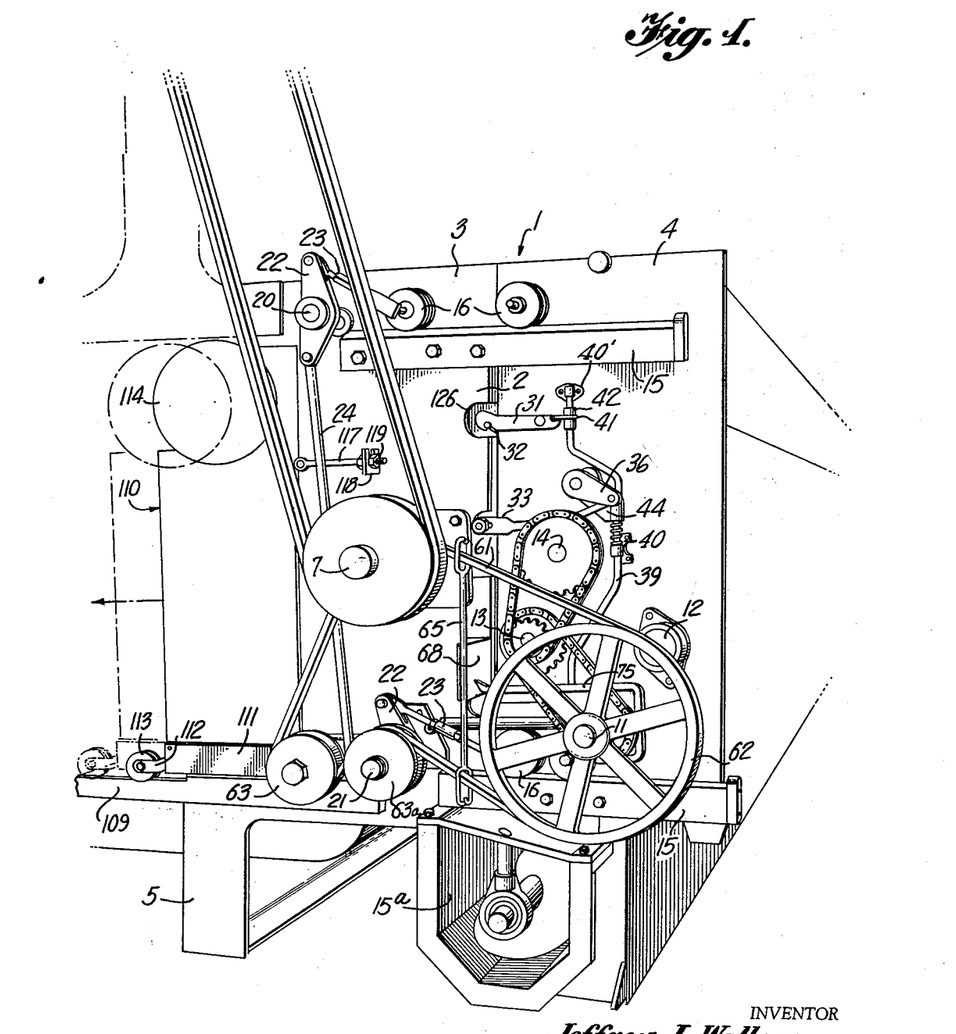
FIGURE 1 is a perspective view of a cotton gin embodying the principles of the invention, showing the gin fully closed, the view being taken from the side of the gin upon which most of the driving trains to the various rotary elements are mounted.
Figure 4:
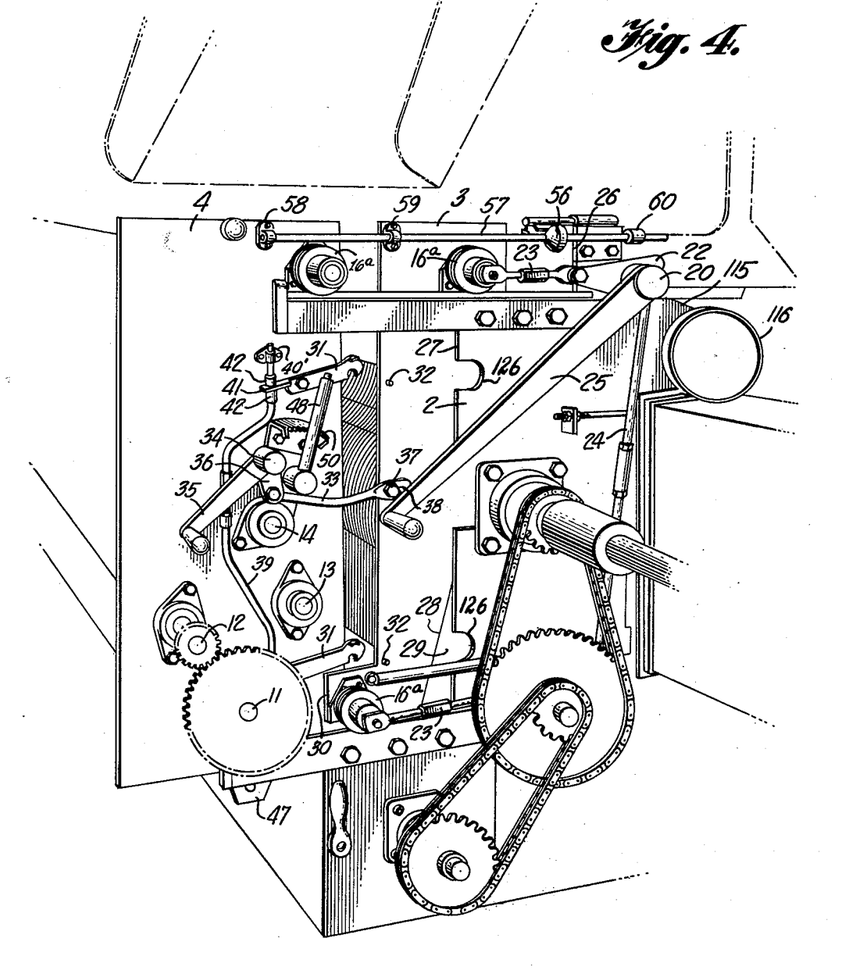
FIGURE 4 is a perspective view of the gin fully open as in FIGURE 2, viewed from the opposite side showing control levers and linkage for closing and opening the breasts, also driving connections to the seed conveyor.
Figure 8:
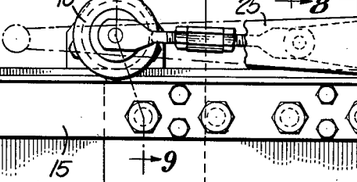
FIGURE 8 is a cross section taken along the line 8—8 of FIGURE 7.

Parallel track bars 15 are arranged in upper and lower horizontal planes, the bars of the upper pair being rigidly secured to each of the plates 2 near their top and the lower bars being secured at opposite sides of the lower frame members of the fixed component that extend forwardly above the seed conveyor 15a. The ginning and hulling breasts are movably supported upon the track bars by means of flanged rollers 16, 16a which ride upon the upper edges of the track bars. In the gin as shown there is one roller 16 near the top and one near the bottom on one side of each of the plates 3 and 4. On the other side and similarly positioned are rollers 16a which differ from the rollers 16 in the manner presently to be described. The rollers 16 are mounted on stub shafts 17 at one side of the gin while the rollers 16a are mounted on stub shafts 18 at the opposite side. The stub shafts project from individual base plates 19 fixed to the side plates 3 and 4. A shaft 20 extends transversely across the upper part of the fixed gin component, journalled in the plates 2 near their rear ends and extending beyond said plates on each side. Stub shafts 21 are mounted coaxially at opposite sides of the lower part of the fixed gin component. Bell crank levers 22 are fixed to the extended ends of the shaft 20 and rotatably mounted on the stub shafts 21 in the same phase of angular displacement, each bell crank being pivotally connected at its longer end with an adjustable link 23, the latter being pivotally connected to the corresponding shafts 17 on one side of the gin and roller shafts 18 on the other side. Connecting links 24 are positioned at opposite sides of the gin pivotally connected at their opposite ends to the shorter arms of the bell cranks for effecting simultaneous operating of the bell crank levers on both sides. A handle 25 is provided fixed to the shaft 20 which, when moved upwardly from the position shown in FIGURE 4, rocks the bell cranks in an upward direction, pulling the ginning breast toward the fixed gin component. The adjustment of the links 24 and the relative position of the upper and lower rollers on the plates 3, causes the plates to be translated upright from open to closed position. It is to be noted that the width of the ginning breast is slightly narrower than the width of the fixed gin component so that the plates 3 lap between the plates 2 whereby, in closing, the portions of the plates 3 below the upper edges of the upper track bars telescope within the fixed gin component until they are substantially obscured by the plates 2 as shown in FIGURES 1 and 3. Above the upper track bars the plates 22 are cut away a sufficient distance to provide a runway for upper rollers 16 and 16a of the plates 3. The extent of this cutaway portion is indicated by the position of the vertical edge 26 of the upper part of the plates 2 relative to the forward vertical edges 27 which extend below the track bars as shown in FIGURE 4. The lower rear edges 28 of the plates 3 are inclined forwardly, narrowing the lower parts of said plates so that, when they are in the open position shown in FIGURES 2 and 4, an open space 29 is provided between the lower parts of plates 2 and 3, giving access for inspection or for removal of debris which may have accumulated, such as material that may have dropped through the spaces between the saws. At their forward lower ends the plates 3 are formed with extensions 30 required for the mounting of the laterally opposite lower rollers 16 and 16a which are connected to the lower links 23 at such distance from the corresponding bell cranks as to allow full extension of said links. The lower ends of plate 4 have complementary cut-out recesses interfitting with the extensions 30.

The ginning and hulling breasts are of the same width so that the corresponding adjacent vertical edges of the plates 3 and 4 abut in flush manner when the hulling breast is in closed position against the ginning breast. Normally the two breasts are held closed by the upper and lower hooks 31, two on each side, pivoted to the plates 4 and engaging pins 32 on the plates 3. By this arrangement, normally when the handle 25 is moved to open or close the ginning breast with respect to the gin component, both breasts move as a unit. The forward edges of the plates 2 of the fixed component are formed with upper and lower indentations 126, into which the pins 32, encompassed by the ends of the respective hooks, extend when the ginning breast is in full telescoped relation to the fixed gin component. The indentations are sized to fit with sufficient closeness about the ends of the hooks to prevent them being unlatched while the breasts as a unit are in closed position with respect to the fixed component. Only when the ginning breast has been moved away from the fixed component may the hooks be unlatched and the huller breast be opened.

The hulling breast is joined to the ginning breast by connecting links 33, one on each side, approximately midway in the height of the plates 3 and 4. These links act as push rods to move the breasts apart but are inoperative so long as the hooks 31 are latched. A shaft 34 extends transversely through the hulling breast extending beyond the plates 3 on both sides, having an operating handle 35 at one end, at the same side of the gin as the handle 25. Said shaft carries at each end a crank arm 36, said crank arms being in the same phase of angular displacement and each being pivotally connected to one end of the corresponding link 33. Each of said links is connected to a corresponding stud 37, the latter playing in a slot in the link which provides a small extent of lost motion between the handle 35 and the stud.

A latching and releasing rod 39 is reciprocably mounted, one on each of the plates 4, the upper and lower ends of which are slidably retained in guide plates 40′ secured to the plates 4 adjacent the respective upper and lower hooks 31, and a similar guide plate 40' is secured to the plates 4 at an intermediate point in the length of the rods 39. The hooks have flat perforated extensions 41 to the rear of their pivotal axes, the rods 39 passing through the perforations. Nuts 42 on the rods above and below the flat extensions and in operative nearness thereto to engage the extensions as the rods are reciprocated to tilt the hooks in a latching or releasing direction. The shaft 34 carries a pair of cams 43, one adjacent each crank arm, arranged in operative relation to the lugs 44, one being shown in FIGURE 7, which are fixed to the rods 39 and extend laterally toward the respective cams. A compression spring 45 surrounds each rod, being compressed between the corresponding lug and adjacent guide plate 40 and normally thrusting upwardly to latch the hooks and maintain them latched. When the handle 35, referring to FIGURE 3, is turned in a counterclockwise direction the first effect of crank arm 36 is to push the connecting links forwardly through the range of lost motion provided by the slots 38 without exerting any thrust against the studs 37. In this brief interval, however, the cams 43 come into contact with the lugs 44 pushing them down against the bias of the spring 45, thereby reciprocating the rods downwardly, releasing the hooks 31 from the pins 32. As the handle 35 continues to be moved counterclockwisely, the connecting links thrust against the studs 37 and separate the plates 4 from the plates 3. Upon reverse movement of the handle 35 the crank arms 36 pull the connecting links 33 against the stud and move the forward ends of said links forwardly with respect to the plates 4, bringing the adjacent vertical edges of the plates 3 and 4 into abutment, thus closing the hulling breast against the ginning breast. In the latter part of this movement after the plates 3 and 4 have come together, the eccentric portions of the cams 43 move off of the lugs 44 releasing the springs 45 and causing the rods 39 to move upwardly tilting the hooks into latched position in engagement with the pins 32. Since the hulling breast is connected to the ginning breast solely adjacent the middle of its height and by pivotal connections, and does not have the stabilizing advantage afforded the ginning breast by its being connected at upper and lower ends by the links 23 to the fixed gin component, it requires support additional to the rollers on each side, one at top and one at bottom, which hold it on the track bars. This added support is provided by the rollers 46, one on each side, which are journalled in brackets 47 fixed to lower track bars adjacent their forward ends and which engage the bottom edges of the plates 4.

There are many purposes served in opening the breasts of a gin, one of the most important being the dumping of the roll box, which is a periodic necessity. FIGURE 3 in broken lines indicates that one half of the roll box and also the ginning ribs are carried by the ginning breast between the plates 3 and the other half of the roll box as well as the hulling ribs are carried by the hulling breast. When the breasts are closed the ginning ribs and hulling ribs define a channel through which seed are discharged upon separation from the lint in the process of ginning. This channel which opens to the roll box is intersected by the saws which also intersect the roll box. The saws feed cotton into the roll box and withdraw cotton out of the roll box at the ginning point, at which the rims of the saw pass between the ginning ribs. The roll which revolves in the roll box is built up by cotton fed into the roll box and depleted by cotton which is withdrawn. Most of the seed separated by the ginning leaves the roll box through the passages between the saw's back of the cotton which clothes the rims. However, a good deal of seed and trash accumulates in the roll box until there is little room for the reception of new cotton. Then the roll box must be dumped, necessitating first that the ginning breast be moved out from the fixed saw cylinder component which moves the ginning ribs and the adjacent part of the roll box away from the saws so that they are no longer in obstructive position with respect to the roll box and the channel between the sets of ribs. Next the hulling breast is moved away from the ginning breast. This moves the half of the roll box carried by the hulling breast away from the part carried by the ginning breast, opening wide the bottom of the roll box, also widening the space between the two sets of ribs so that the debris in the roll box drops through by gravity. Incidentally, the handle 48, which is shown positioned adjacent the handle 35, adjusts the position of the lambrequin 49, the latter being a baffle extending the width of the gin which adjustably presses against the roll of cotton in the roll box controlling its diameter, therefore its density and the rate at which the cotton is presented to the saws. The lambrequin in effect forms part of the wall of the roll box and must be tilted to the unobstructive position indicated in FIGURE 3 by means of the handle 48. This handle is held in positions of adjustment through engagement with the toothed rack 50.

Since generally more than one gin is driven by the same drive shaft it is ordinarily not desirable to shut down the operation of the saw cylinder preparatory to separating the breasts. The withdrawal of the saws from between the ribs makes it safe to reach into the access space between the two breasts with a stick, or otherwise, to dislodge any portion of the spent roll that may not come away fully when the roll box is open, or to remove obstructive masses from the hulling instrumentalities. This, as everyone knows, is a feature common to all double breasted gins. However, it has been known for the operator inadvertently to close the ginning breast while the hulling breast is still open, thus projecting the toothed rims of the saws forwardly of the ginning ribs, sometimes resulting in a mangled arm or worse. The present invention provides additional safety means which prevents closing of the ginning breast while the hulling breast is open, this being best shown in the large scale FIGURES 5–8, inclusive. Said safety means comprises a freely swinging stop member 51 hingedly mounted upon a pin 52, longitudinally projecting from a plate 53 mounted at the top of the side plate 2 at one side of the gin, preferably the side on which the handles 25, 35 and 48 are located. Said plate is suspended at a level slightly above the upper edges of the plates 2 and 3 and over the space between the upper portions of said plates when they are in separated relation at the top. The stop member 51 includes divergent wings 54 and 55 which extend downwardly, the former being relatively heavy and when in repose position being in unobstructive position with respect to the plate 3. The wing 55 is relatively light and cooperates with the actuating cam 56 by means of which it is displaced laterally to swing the heavy wing into obstructive position in the path of movement of said plate. The cam 56 is fixed to the intermediate portion of rectilinear rod 57, the latter extending horizontally and parallel to the sides of the plates 2, 3 and 4. Said rod is fixedly mounted in a fitting 58 secured to the plate 4 so that it moves reciprocably with said plate and not relative thereto. The rod slides through guides 59 and 60 secured respectively to plate 3 and to plate 2.

FIGURE 5 shows the position of the cam 56 when both breasts are closed. It is at the far end of the plate 53 and out of contact with the stop member 51. Therefore the latter hangs with its heavy wing inwardly beyond the path of movement of the plate 3. The latter plate has moved past the inactive stop member to close the gap between itself and the plate 2. FIGURE 7 shows the ginning breast in open position, the hulling breast being still closed. Since the ginning and hulling breasts in this figure are together they necessarily opened as a unit and the rod 57 with the cam at its end was pulled forward a distance equal to the width of the gap between the plates 3 and 2 at the top, the cam engaging the wing 55 and diverting the stop member laterally to a position in which the heavy wing 54 is in line with the plate 3. Now, the length of the wing 55 is such that when the hulling breast is opened, the cam 56, which is drawn forward a distance equal to the gap between the plates 4 and 3, remains in engagement with the wing 55 continuing to hold the stop wing 54 out in the path of movement of the plate 3 in position to stop said plate, should the latter move in a closing direction with the hulling breast still open.

It will be recalled with reference to FIGURE 4 that opening of the hulling breast is accomplished by the pushing of the crank arms 36 against the connecting links 33 which, in turn, thrust against the plate 3, so that the ginning and hulling breasts are positively held apart by the connecting links and cannot be closed except through operation of the handle 35. So if the ginning breast moves in a closing direction, the open hulling breast will move with it and not relatively to it, the slight lost motion between the slots 38 and studs 37 being ignored. By the time the ginning breast has moved the distance embraced by the brace a in FIGURE 7, the cam has moved along the wing 55 an equal distance, still holding the stop wing out in the path of movement of the plate 3. The plate 3 therefore is stopped and it can go no further until the hulling breast is closed; the act of closing the hulling breast moves the cam off of the wing 55 in a rightward direction, as viewed in FIGURE 7 so that the stop wing 54 swings out of obstructive relation to the plate 3 and closing of the hulling breast can be completed.

Figure 10:
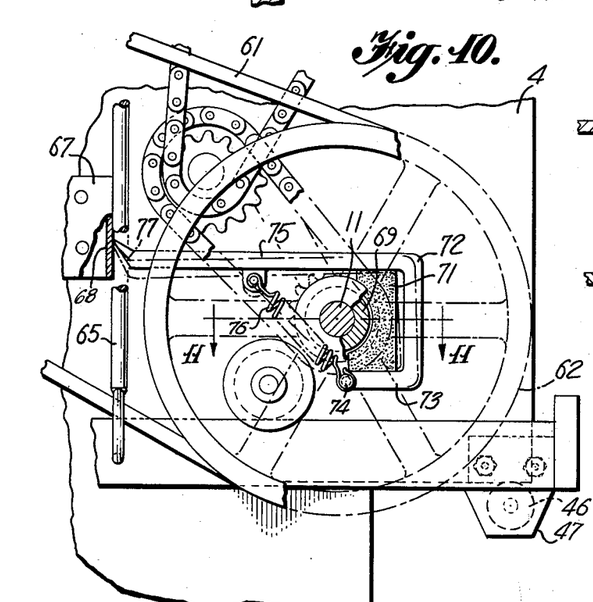
FIGURE 10 is a fragmentary side elevation, partly in section, showing a brake for absorbing the inertia of the driven elements of the hulling instrumentalities, and the means for applying said brake responsive to the movement of the breasts away from the saw cylinder component.

Referring now to FIGURES 1, 2 and 10, these show in particular the driving connection between the saw cylinder shaft which is the main drive and the group of rotatable elements carried by the hulling breast. This driving connection is a belt 61 which embraces a sheave on the shaft 7, not shown, and the pulley 62 on the reclaimer saw cylinder shaft 11, the latter being the primary driving element of the group of rotatable devices in the chamber of the hulling breast. Obviously the power to the hulling gin must be interrupted when the ginning breast or both breasts are opened, for in this position the saws are withdrawn from the ginning and hulling ribs and the hulling instrumentalities are not then functionable. This interruption in the driving transmission is done through the movement of a belt tightening pulley 63 to the belt slackening position when the handle 25 is moved to open the ginning breast. The pulley 63 is mounted at the end of an arm 64 fixedly related to the adjacent bell crank 22 that participates in the opening and closing of the ginning breast, and extending from said arm at a large angle. FIGURE 1 shows the pulley 63 in belt tightening position, the belt being under working tension riding upon the face of an underlying pulley 63ᵃ free running upon the adjacent stub shaft 21. The pulley 63ᵃ holds the flight of the belt that rides upon it in a constant position permitting the belt tightening pulley 63 to pull the belt into a loop as the ginning breast closes against the fixed component thereby tightening the belt, and releasing the loop to slacken the belt as the breast moves away from the fixed component. FIGURE 2 shows the pulley 63 in the slack position of the belt. It is obvious that if the hulling breast were closed, the belt would be still more slack. A vertical guide rod 65 is provided having eyes 66 at its ends through which the respective flights of the belt travel, the belt being thus prevented when slack from falling off of the pulleys that it connects. The eyes have open slots at their ends permitting easy insertion of the flights of the belt into the eyes, the slots being so disposed that the flights are retained thereby. The guide rod is supported by a bracket 67 projecting from the plate 2 which, in the form shown, is made of stiff sheet stock having the shape of a triangular prism and having a face 68 perpendicular to the plane of the plate 2.

Figure 11:
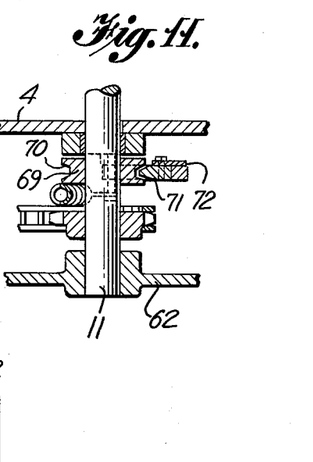
FIGURE 11 is a fragmentary sectional view taken along the line 11—11 of FIGURE 10.

When the belt is made slack by the means described the rotatable members in the hulling breast would ordinarily keep on rotating for a while due to inertia, and being separated from the saws, they would discharge the salvageable cotton contained in the hulling gin without its having been subjected to the action of the saws and it would be thrown out with the trash and lost. It is therefore necessary to provide a brake to stop rotation immediately upon the opening of the breasts. This brake has the form of a sheave 69 (FIGURES 10 and 11) having a circumferential V-groove 70 with which a brake shoe 71 cooperates, having an arcuate recess which embraces a substantial part of the periphery of the sheave and has an inner circular edge, the contour of which is complementary to the shape of the V-groove. Externally the brake shoe is shaped to fit within the rectangular bight of a brake shoe carrier 72 and is secured within said bight. The carrier is positioned in a vertical plane and has a short arm 73 extending beneath the brake sheave, pivoted to a fixed pin 74 projecting from the side plate 4, and a long arm 75 extending over said sheave and reaching into cooperative nearness to the perpendicular face 68 of the bracket 67. A heavy spring 76 is attached at one end to a lug on the long arm 75 and at its other end anchored to said pivot pin. The perpendicular face 68 of the bracket 67 is in the path of movement of the arm 75 as the hulling breast moves toward closed position. The adjacent end of the arm 75 is turned up inclinedly so as to contact the face 68 at a level above the pivotal center of the brake and slide upwardly along said face as the hulling breast continues its closing movement, rotating the brake shoe to release the brake. This release is substantially simultaneous with the operative tensioning of the belt. When the ginning and hulling breasts move apart, the face 68 of the bracket recedes from the long arm, permitting the spring to pull it down, rotating the brake shoe arm about the pivot 74, applying the brake shoe to the brake sheave under pressure of the spring.

The improvements covered in the subject application are particularly, although by no means exclusively, designed for coordinate use with the type of gin described in my companion application for patent hereinbefore cited and which contemplates a gin of greater capacity than that of the present conventional gins, the excess capacity being derived in part from the use of ginning saws of larger diameter than heretofore thought feasible, for example 16 inches, giving the advantage of greater peripheral speed and larger cotton carrying capacity, mounting a greater number of saws on the saw cylinder than is now considered practicable, providing new rib construction for taking care of the increased rate of cotton flow and stepping up the hulling facilities commensurately with the larger amount of cotton handled. The increased size of the saw cylinder both as regards diameter of the saws and their number, 140 to the cylinder being an example, increases the weight of the saw cylinder to such an extent as to create a problem in obtaining rigidity of construction adequately to prevent whipping vibrations in operation which would bring the toothed rims of the saws into contact with the ribs.

Figure 12:
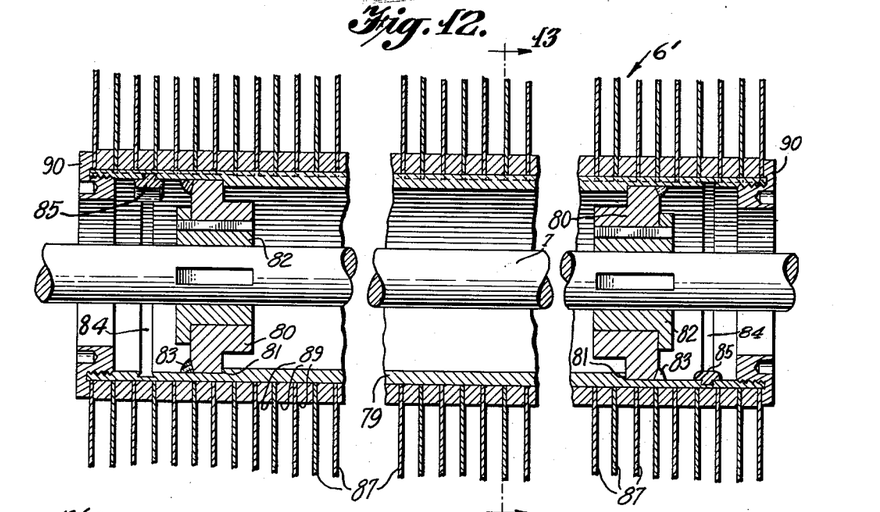
FIGURE 12 is an axial section of the saw cylinder and part of the saw cylinder shaft, parts of said shaft being broken away.
Figures 13, 14:
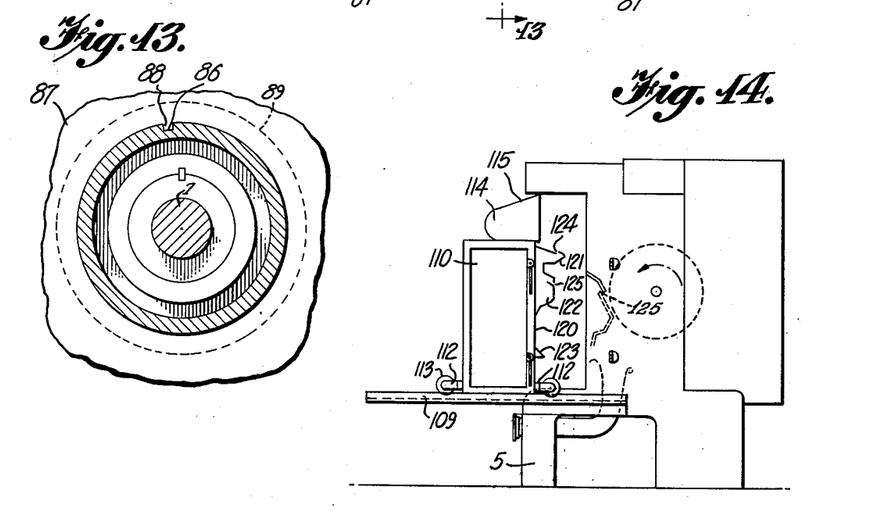
FIGURE 13 is a view in cross section taken along the line 13—13 of FIGURE 12.
FIGURE 14 is a view in side elevation, largely diagrammatic, showing the air pressure chamber with its contoured forward face defining a mote nozzle, doffing nozzle, and lint flue baffle, the air pressure chamber being rolled away with respect to the fixed gin component.

The present invention provides a saw cylinder 6' the saws of which are not mounted upon the drive shaft but upon a tube or drum 79 of larger diameter open at its extreme ends. This drum is supported in fixed relation to the drive shaft 7 by means of heads 80. The drum 79 is counterbored from both ends from shoulders 81 inset some distance from the ends of the drum. The heads 80 abut the shoulders and are welded in place as indicated at 83. The heads have concentric openings and include flanged annular bushings 82 which fit into said openings and also fit the drive shaft 7. The bushings are keyed to the drive shaft and to surrounding parts of the heads as shown in FIGURES 12 and 13. The sturdiness of this structure is enhanced by the inset position of the heads which thereby shorten the unsupported span of the drum between them. In a saw cylinder of this length and weight it becomes necessary to further dampen vibration by balancing the saw cylinder dynamically. In view of the complete coverage of the saw cylinder with saws there is no room exteriorly for the location of balancing weights, but the recessed ends of the drum afford an accessible location for such weights. For this purpose the inner wall of the drum within the recessed ends is formed with circumferential grooves 84 preferably dovetailed in cross section. A lead weight 85 or its equivalent, having a short stem fitting the width of the narrow mouth of the groove 84, may be adjustably positioned circumferentially of the groove at the point to be counterbalanced, and tapped with a hammer, spreading the stem to fill the cross section of the groove, thus fixing the position of the weight.

The drum 79 has a longitudinal keyway 86 extending the full length of the saw cylinder and the punch holes in the saws 87, which are made to fit the drum, are cut to form tongues 88 which slidably fit the keyway and permit the saws to be slid into place longitudinally of the drum to prevent their rotation relative thereto. The saws are arranged with annular spacers 89 therebetween, and the spacing must be quite precise in order for each saw to be equidistant from the ribs between which it operates. A very small cumulative error in spacing may result in excessive longitudinal displacement of the saws at the end of the series. The space between saws is substantially 0.78 inch, and the ribs are substantially one-half inch wide so that the clearance between saws and ribs is not much greater than one-eighth of an inch so that a cumulative very small error could bring at least some of the saws in collisive proximity to the ribs. The saws and spacers are fixed in position by ring nuts 90 having hub portions that screw into the drum at the ends and peripheral flanges that engage the end saws within the projected area of the spacers clampably embracing the series of saws and spacers.

For various causes the precise setting between the saws and ribs does not persist but may gradually deteriorate until one or more of the saws makes contact with the adjacent rib, quickly dulling the saw. One of the causes for the saws getting out of adjustment is non-uniform frictional heating of the saws through rubbing contact with the cotton at the hulling and ginning points and as they pass through the roll box. The outer portion of the saw runs warmer than the central portion so that, in consequence, the outer portion expands and since the expansion is circumferentially confined, the result is that the outer portion is forced out of planiform shape in one or more places so far as to bring it into contact with an adjacent rib. In the large diameter saws contemplated by the present invention, this heat distortion is likely to occur to a more noticeable extent than in conventional saws. Often, contact of the saws with the ribs is not noticed while the gin is running for centrifugal force tends to bring the distorted portions of the saw back to planiform position and it is only when the gin is stopping and the speed of the cylinder decelerating that the striking of saw teeth against the ribs may be noted by the sound. When the gin is not running and it is attempted to close the breasts, head-on contact of the ribs with the teeth of heat-distorted portions of the saws may take place, which is ruinous to the operating efficiency of the saws affected. It is for this reason that the ribs of both breasts in my companion application are beveled at the edges on the side of the rib fronts on the approach side to guide the blades into the rib slots instead of subjecting them to head-on impact.

Figure 9:
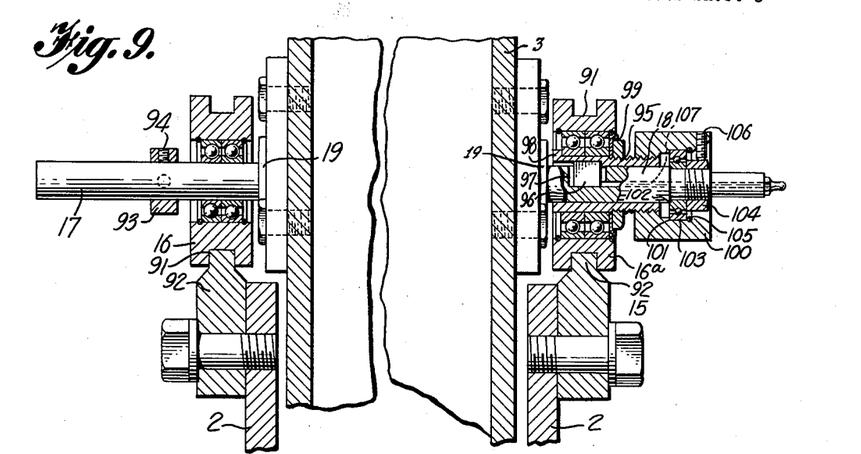
FIGURE 9 is a fragmentary cross sectional view taken in the axial plane of the saw cylinder shaft, the intermediate part being broken out in a diametrical plane, showing the upper track bar and corresponding axially slidable supporting rollers at one side of the gin and the corresponding track bar and adjustable rollers, said track bars being identical with the lower track bars on each side, the rollers being identically duplicated on both the ginning and hulling breasts, permitting adjustment of the hulling and ginning ribs relative to the saws through bodily lateral adjustment of the breasts relative to said rollers.

The instability of the spaced relation between saws and ribs requires that from time to time either the saw cylinder or the rib units (generally referred to as the rib "fronts") be laterally adjusted to restore the proper clearance. In the present invention the feature of the breasts being mounted by grooved rollers upon tracks fixed to the saw cylinder component of the gin affords the opportunity to provide a simple and efficient means for adjusting the breasts laterally with respect to the rollers without moving the heavy saw cylinders. Referring in particular to FIGURES 3 and 9, it has hereinbefore been noted that the pairs of parallel plates 3 and 4 which form the sides of the breasts are each supported on the corresponding track bars 15 by a single roller 16 or 16a, at top and bottom. FIGURE 9 therefore illustrates a section in vertical plane through the top or bottom of either breast. The rollers 16 and 16a are provided with similar circumferential grooves 91 which fit the guide flanges 92 at the tops of the track bars without appreciable play. The axes of respective rollers at the top and bottom of each pair of plates lie in longitudinally spaced transverse vertical planes, the length of the base of support of each breast being the distance between said planes, which distance being of appreciable magnitude nullifies the tendency of the plates to pivot on their bearings and bind against the track bars. It is therefore obvious that there is no appreciable lateral movement possible between the rollers and track bars so that the only opportunity for lateral adjustment of the breasts is in having them move relative to their rollers.

Referring to FIGURE 9 the stub shafts 17 which are at one side of the gin, one being shown, are of uniform cross section, upon which the rollers 16 are journalled with some freedom of sliding movement, its limit being determined by the position of the collar 93 which is fixed by the set screw 94 to the shaft. All of the supporting rollers on one side of the gin are thus mounted, permitting the breasts to slide laterally relative to these rollers. The stub shafts 18 which carry the rollers 16a on the other side of the gin are fixedly mounted on base plates 19, the latter being fixedly secured respectively to the plates of the ginning and hulling breasts, only one of the plates 3 being shown in FIGURE 9. The stub shafts 18 are each of stepped diameter, the part of largest diameter being next to the corresponding base plate and forming the seat for a sleeve 95 which is axially slidable on said stub shaft but not rotatable by virtue of a key 96 carried by the stub shaft which extends into a slot 97 in the sleeve. Said slot is longer than the key, in which slot the key has longitudinal play preferably to the same extent provided by the collars 93 on the shafts 17. The roller 16a is freely rotatable upon the sleeve but cannot move in an axial direction, being confined between the flange 98 at one side and a nut 99 secured upon a threaded portion of the sleeve in a zone just beyond the opposite side of the roller with a washer interventing. Obviously the track bar, roller, and sleeve form a unit with respect to their incapacity to move laterally so that the adjusting movement of the breasts has to be made by transmitting force to the stub shafts 18, pushing them in or out relative to the sleeves according to the direction of the adjustment.

The adjusting means comprises a large nut 100 which is preferably externally cylindrical and knurled to serve as an adjusting knob. It has one end freely threaded upon the adjacent end of the sleeve and is widely counterbored at the other end extending about the portion of the stub shaft that is exposed beyond the end of the sleeve, and out of direct contact therewith. The wall of the counterbore is formed with a bearing seat defining a shoulder 101 and the stub shaft is reduced in diameter to define a shoulder 102 in the same diametrical plane as the shoulder 101. A bearing 103 surrounds the stub shaft and seats against the shoulder, fitting the bearing seat in the nut and supporting said nut. Said bearing 103 is retained against said shoulders by a nut 104 screwed on an adjacent threaded portion of the stub shaft, assisted by a snap ring 105.

The adjusting nut 100 is thus unitary with the stub shaft with respect to its incapacity of moving axially of said stub shaft so that when it is turned it must react against a longitudinally stationary sleeve to push itself and the stub shaft axially in one direction or another according to the direction in which the nut 100 is turned.

Thus the breast, or both of them, are slidably moved relative to their supporting rollers 16 and 16a on each side. The adjustment is made independently with respect to each stub shaft. The magnitude of the range of adjustment is quite small, normally not exceeding one-eighth of an inch. The rollers 46 (FIGURE 3) that support the lower rear portion of the hulling breast, when extended, are not involved in the adjusting operation since their cylindrical supporting faces are ungrooved. The nut 100 in its adjusted position is fixed against vibrational displacement by a set screw 106 which extends through the rim of the adjusting nut and tightens against the nut 104.

The manner of adjusting the saw clearances as described, by moving the breasts or either of them bodily laterally relative to the saws, provides means by which a minute adjustment can be made from one end of the gin while the gin is running. The point of adjustment at which all of the blades clear the ribs is readily discernible to the man making the adjustment by the cessation of the rasping sound of blade against rib. In a conventional gin the adjustment must be made at both ends while the saw cylinder is shut down. The blades are many and obstructed by cotton and it is difficult readily to detect visually the blade which may be contacting the ribs. The adjustment is a matter of trial and error generally requiring rapid stopping and starting of the saw cylinder.

The bearing interface between the sleeve and stub shaft and the engaging surfaces of the key and keyway are lubricated through an axial bore in the stub shaft indicated in broken lines at 107 in FIGURE 9, terminating in a grease fitting at the end of the stub shaft.

One of the basic improvements embodied in the gin of the present invention is the provision of a mobile air pressure chamber which normally closes the rear of the gin and can readily be rolled away to expose the rear of the saw cylinder from end to end and the mouth of the lint flue, also to make accesible the region above the saw cylinder and back of the ginning ribs where intricate movements of cotton occur incident to the close association of lint being robbed back, with lint centrifugally thrown from the saws at the ginning point and traveling upward toward the return passage for the robbed-back lint into the roll box, this being the region where congestion of cotton is most likely to occur, frequently resulting in a gin fire, and requiring quick and frequent access to remove congested matter. In the case of the substantially 10-foot long saw cylinder contemplated in the present invention, the high pressure or blast chamber is necessarily of heavy construction to obtain rigidity and the provision of means for readily moving it into and out of working position is of prime importance.

In carrying out this phase of the invention, the fixed component of the gin, that is, the part that supports the saw cylinder, is provided with a pair of lower track bars 109 extending horizontally in a rearward direction. The respective bars are secured to corresponding side plates 2 of the fixed component of the gin, as shown in FIGURES 1, 2 and 3. The blast chamber 110 extends across the gin the full length of the saw cylinder and is of uniform cross section throughout. Its enclosing wall is of heavy sheet material shape-supported by a suitable frame of angle iron, one end of which is shown at 111. Front and rear brackets 112 are secured to the frame at the bottom. These carry grooved rollers 113 which rest upon the track members and are guided thereby. The top, bottom, back wall and ends of the blast chamber are preferably rectangular in shape. A mote duct 114 is detachably seated on top of the blast chamber. It also extends the full width of the gin and is of uniform cross section throughout, its top wall 115 being inclined upwardly so that it presents a flaring mouth to the mote chamber, which is the space within the gin back of the roll box and above the saw cylinder. Preferably at one end the mote duct is connected by a transition, not shown, to a cylindrical duct 116 subject to suction from a source (not shown) through which the motes are discharged. One end of the blast chamber is open and connected by a transition to a duct, not shown, which supplies air under pressure to the blast chamber.

The perimeter of the front of the blast chamber and that of the mote duct lie in a common vertical plane and fit congruently flush against the rim of an opening in the back of the gin when the blast chamber has been rolled to a position against the gin. Suitable lateral fastening means are provided, such as the swing bolts 117, the threaded ends of which seat in open slots in fittings 118 secured to the plates 2, said bolts being drawn tight by nuts 119 which react against the fittings.

It is to be noted that the front wall 120 of the blast chamber extends beyond the plane of juncture of the blast chamber and gin and is contoured to form three salients or ridges 121, 122 and 123, which extend the full length of the gin. The salients 121 and 122 are formed of plates so shaped and lapped as to form nozzles 124 and 125, the former being directed inclinedly upward toward the mouth of the mote duct and the latter being directed downward. When the blast chamber is in closed position, nozzle 124 is close to the back of the ginning ribs below the level of the line of intersection of the saws with the ribs, creating an air curtain across the mote chamber in the path of the thrown off motes of low trajectory, these becoming entrained in the high velocity air that constitutes said curtain and carried with it into the mote duct above the lower edge of the mote duct. This feature is of great utility since at times the hull debris shattered by the saws is green, exuding sticky juice which would ordinarily cause an adherent mass of debris and motes to build up obstructively against the mouth of the lint duct. These motes are blown into the mote duct and come into the influence of the suction in said duct before they have had time to lodge in the closed position of the blast chamber. The nozzle 125 is slightly above the horizontal diameter of the saw cylinder and so positioned as to direct an air jet downward tangentially of the saw cylinder to doff the lint therefrom. The salient 123 is an uninterrupted portion of the front wall of the blast chamber so shaped as to form a downwardly and forwardly inclined baffle which, when the blast chamber is in closed position, lies adjacent the mouth of the lint flue and directs doffed lint into said flue.

FIGURE 14 shows the blast chamber in open position giving access not only to the nozzles in the front wall of said blast chamber but also to the inside of the motor duct, saw cylinder, the mouth of the lint flue, the upper rib components and the adjacent side of the roll box for inspection and servicing, such as the removal of obstructions or the use of a fire extinguisher. Obviously, it would be necessary to uncouple the mote duct and blast chamber from flue systems extraneous to the gin before the blast chamber could be rolled away from the gin.

While I have in the above description disclosed a practical embodiment of the invention, it is to be understood by those skilled in the art that the specific details of construction and arrangement of parts are by way of example and not to be construed as necessarily limiting the scope of the invention.

What is claimed is:

1. Cotton gin comprising a fixed component including a saw cylinder, having laterally spaced fixed plates forming the sides of said component, upper and lower pairs of track bars extending forwardly from said fixed component, the track bars of at least one pair being fixed to the respective sides of said component, and the track bars of each pair having parallel guiding faces, ginning and hulling breasts each including laterally spaced side plates, the side plates of the respective breasts being independently slidably supported upon the guiding faces of said track bars, said guiding faces being rectilinear throughout the range of sliding movement of said breasts, the side plates of said fixed component and of said breasts being serially contiguous when said breasts are in operative position with respect to the saw cylinder, latches for holding said breasts together whereby they are movable as a unit along said track bars, means for separating said breasts from said fixed component and means for separating said hulling breast from said ginning breast, said latter means, so constructed as, in cooperation with said guiding faces, to translate said side plates untilted, from closed to open position, comprising connecting links between the side plates of said breasts pivotally connected to the side plates of one breast, crank arms carried by the side plates of the other breast to which the opposite ends of said connecting links are connected, a hand lever operatively connected to said crank arms, means connecting said latches for simultaneously moving all of them to latched or unlatched position, when actuated, and means operatively related to said latch moving means and movable responsive to the initial movement of said lever from its extreme position in either direction, for alternatively unlatching said breasts prior to the breast opening movement of said connecting means and latching them at the end of the breast closing movement of said rods.

2. Cotton gin comprising a fixed component including a saw cylinder having laterally spaced fixed plates forming the sides of said component, upper and lower pairs of track bars extending forwardly from said fixed component, the track bars of a pair being fixed to the respective sides of said component, the track bars of each pair having parallel guiding faces, ginning and hulling breasts each including laterally spaced side plates, the side plates of the respective breasts being independently slidably supported by the guiding faces of said track bars, said guiding faces being rectilinear throughout the range of sliding movement of the breasts, the side plates of said fixed component and of said breasts being serially contiguous when said breasts are in operative position with respect to the saw cylinder, a rotatable hulling element carried by said hulling breast, driving means between said saw cylinder and rotatable hulling element transmitting driving torque to the latter when said breasts are closed with respect to one another and to said fixed component, and means responsive to the movement of said breasts away from said fixed component for interrupting the transmission of said driving torque and maintaining it interrupted until the breasts have been returned to closed position.

3. Cotton gin as claimed in claim 2, the driving means for said rotatable hulling element being a belt at one side of said gin, means for separating and closing said breasts with respect to said fixed component, means for separating and closing said ginning and hulling breasts with respect to one another, at the opposite side of said gin, said interrupting means being a swinging sheave operatively related to said breast separating means and engaging said belt, positioned to function as a belt tightener when said breasts are in closed position with respect to said fixed component and to maintain said belt slack while said breasts are not in closed position.

4. Cotton gin comprising a fixed component including a saw cylinder, and ginning and hulling breasts, said fixed component and each of said breasts including spaced side plates in vertical planes serially disposed to form the opposite sides of the gin, ginning and hulling ribs mounted between the side plates of the respective ginning and hulling breasts and movable therewith, means for separating the side plates of said breasts as a unit from said fixed component thereby moving the ribs of both breasts out of operative proximity to said saw cylinder, and means independent of said first-mentioned separating means for separating the ginning and hulling breasts, said second mentioned means including links connecting the side plates of said breasts of such length as potentially to allow the hulling breast to be drawn by said ginning breast, while the breasts are open, as the ginning breast is returned to operative position with respect to said saw cylinder, and safety means controlled responsive to the position of said hulling breast relative to said fixed component constructed to prevent the ginning breast being returned to operative position until the hulling breast is in closed position with respect to the ginning breast.

5. Cotton gin comprising a fixed component including a saw cylinder, and ginning and hulling breasts, said fixed component and each of said breasts including spaced parallel side plates in vertical planes serially disposed to form the opposite sides of the gin, ginning and hulling ribs mounted between the side plates of the respective ginning and hulling breasts and movable therewith, means for separating the side plates of said breasts as a unit from said fixed component, and means independent of said first mentioned separating means for separating the ginning and hulling breasts one from another, said second mentioned separating means including links connecting the side plates of said breasts, of such length as potentially to allow said hulling breast to be drawn by said ginning breast, while the breasts are open, as the ginning breast is returned to operative position with respect to the saw cylinder, and safety means to prevent the ginning breast being returned to operative position until the hulling breast is closed with respect to the ginning breast, said safety means comprising an elongated stop member mounted on the fixed component, extending forwardly therefrom, freely suspended to swing on a horizontal axis parallel to the plane of the side plates, in repose position being outside the path traversed by the side plate of said ginning breast, and swingable into obstructive position to the movement of said side plate toward said fixed component, an actuator rod for said stop member fixedly carried by the adjacent side plate of the hulling breast, extending towards said stop member and parallel to the axis thereof, an actuator fixed on said rod engageable with said stop member, shaped to swing said stop member into the path of said ginning breast side plate, the position of said actuator and the length of said stop member being so correlated that said stop member is held in obstructive position from the inception of the closing movement of the hulling breast substantially to the completion of said closing movement, and released just prior to the completion of said movement.

6. Cotton gin comprising a fixed component including a saw cylinder, and ginning and hulling breasts which include respectively ginning and hulling ribs, said fixed component and each of said breasts including spaced parallel side plates in vertical planes serially disposed to form the opposite sides of the gin, the side plates of the ginning breasts telescoping within the side plates of the fixed component, track bars fixed to the outer sides of said fixed component at top and bottom, having rectilinear guiding faces extending forwardly, flanged rollers mounted upon the side plates of said breasts at top and bottom slidably supporting the breasts upon said guiding faces, means for separating the breasts as a unit from said fixed component, means independent of said first mentioned separating means for separating the ginning and hulling breasts one from another, said second mentioned separating means including links connecting the side plates of said breasts, of such length as potentially to allow said hulling breasts to be drawn by said ginning breast, while the breasts are in separated relation, as the ginning breast is returned to operative position with respect to the saw cylinder, and safety means to prevent the ginning breast being returned to operative position until the hulling breast is closed with respect to the ginning breast, the upper forward portion of one of the side plates of said fixed component being cut away above the corresponding track bar to form a recess to accommodate said safety means, the latter comprising a hinge pin mounted on the cut away side plate projecting horizontally into said recess, a stop member swingably mounted on said hinge pin, in repose position being outside the path of traverse of the corresponding ginning breast side plate that it is designed to stop, said stop member being formed with divergent wings comprising a stop wing and a cam actuated wing, an actuator rod for said stop member fixedly carried by the adjacent side plate of the hulling breast extending toward said stop member and parallel to said hinge pin, a cam fixed on said rod engageable with said cam actuated wing, shaped to swing said stop wing into the path of said ginning breast side plate, the position of said cam and the length of said cam actuated wing being so correlated that said stop wing is held in obstructive position from the inception of the closing movement of the hulling breast substantially to the completion of said closing movement and released just prior to the completion of said movement.

7. Cotton gin comprising a fixed component including a saw cylinder rotatable about an axis of rotation and having a plurality of saws, and ginning and hulling breasts including respectively ginning nd hulling ribs, said fixed component and each of said breasts including spaced parallel side plates in vertical planes serially disposed to form the opposite sides of the gin, parallel track bars having rectilinear guiding faces, fixed to the side plates of the fixed component at high and low level, extending forwardly, flanged rollers mounted on the side plates of both of said breasts, independently supporting said breasts upon said guiding faces without lateral play, said breasts being unitarily separable from said fixed component and separable from one another, stub-shafts extending outwardly from the side plates of said breasts perpendicularly thereto, affording axes for said rollers, the latter being slidable with respect to said stub-shafts, and means for adjusting said breasts laterally relative to said fixed component for adjusting the saw clearance in directions parallel to said axis of rotation between said ribs and the saws of said saw cylinder, said adjusting means comprising a screw and nut couple for each stub-shaft at one side of the breasts, adjustable in length, positioned to react in an axial direction between a point on the stub shaft and the corresponding roller, for moving said breasts laterally with respect to said rollers and track bars.

8. Cotton gin comprising a fixed component including a saw cylinder rotatable about an axis of rotation and having a plurality of saws, and ginning and hulling breasts including respectively ginning and hulling ribs, said fixed component and each of said breasts including spaced parallel side plates in vertical planes serially disposed to form the opposite sides of the gin, the side plates of the ginning breast being telescoped within the side plates of the fixed component with appreciable lateral tolerance, track bars fixed to the outer sides of the fixed component at top and bottom, extending forwardly, flanged rollers supporting said breasts upon said track bars, said rollers fitting said track bars without lateral play, said breasts being separable from said fixed component and from one another, stub-shafts extending outwardly from the side plates of said breasts perpendicularly thereto, affording axes for said rollers, the latter being slidable with respect to said stub-shafts, and means for independently adjusting said breasts laterally relative to said fixed component for adjusting the saw clearance in directions parallel to said axis of rotation between the ginning and hulling ribs and the saw cylinder, said adjusting means comprising a sleeve on each stub-shaft at one side of the breasts keyed to the stub-shaft with limited sliding movement relative thereto, the corresponding roller being journalled on said sleeve without freedom to slide relative thereto, the outer end of said sleeve being threaded, and an adjusting nut screwed on the threaded end of said sleeve and being rotatably but non-slidably mounted on the stub-shaft, said sleeve and nut forming a couple of adjustable length which reacts between said stub-shaft and roller when said nut is turned for moving said breasts laterally within the limits set by the lost motion in the keyed connection between said sleeve and stub-shaft.

9. Cotton gin comprising a fixed component including a saw cylinder, laterally spaced parallel plates forming the sides of said component, parallel track bars extending forwardly and rearwardly from the side plates of said fixed component and fixed thereto, said gin including also movable components comprising ginning and hulling breasts having spaced parallel side plates slidably supported upon the forwardly extending track bars, and a chamber for supplying air under pressure to said gin slidably supported upon the rearwardly extending track bars, the components of said gin when in operative position being in a substantially contiguous serial train, and being relatively separable serially, upon occasion, through rectilinear traverse of the movable components upon the track bars.

10. Cotton gin comprising a fixed component including a saw cylinder, laterally spaced parallel plates forming the sides of said component, parallel track bars extending forwardly and rearwardly from the side plates of said fixed component and fixed thereto, said gin including also movable components comprising ginning and hulling breasts having spaced parallel side plates slidably supported upon the forwardly extending track bars, and a pressure chamber for supplying air under pressure to said gin slidably supported upon the rearwardly extending track bars, the components of said gin when in operative position being in a substantially contiguous train, and being relatively separable serially, upon occasion, through rectilinear traverse of the movable components upon the track bars, said pressure chamber including a forward nozzled face functionally related to the gin when said chamber is substantially contiguous to the fixed component.

11. Cotton gin comprising a fixed component including a saw cylinder mounted therein and a lint flue having its mouth portion housed within said fixed component, said fixed component including laterally spaced parallel side plates, parallel track bars extending forwardly and rearwardly from said side plates and fixed thereto, said gin including also movable components comprising ginning and hulling breasts having spaced parallel side plates slidably supported upon the forwardly extending track bars, and a pressure chamber for supplying air under pressure to said gin slidably supported upon the rearwardly extending track bars, the components of said gin when in operative position being in a substantially contiguous train, and being relatively separable serially, upon occasion, through the rectilinear traverse of the movable components upon the track bars, said pressure chamber including a forward face formed with a nozzle extending thereacross substantially the length of the saw cylinder so shaped as to direct a lint doffing jet of air substantially tangential to said saw cylinder and toward said lint flue when said air chamber is substantially contiguous to said fixed component.

12. Cotton gin comprising a fixed component including a saw cylinder having laterally spaced fixed plates forming the sides of said component, upper and lower pairs of track bars extending forwardly from said fixed component, the track bars of at least one pair being fixed to the respective sides of said component, the track bars of each pair having parallel guiding faces, ginning and hulling breasts each including laterally spaced side plates, the side plates of the respective breasts being independently slidably supported by the guiding faces of said track bars, said guiding faces being rectilinear throughout the range of sliding movement of the breasts, the side plates of said fixed component and of said breasts being serially contiguous when said breasts are in operative position with respect to the saw cylinder, means for separating said breasts unitarily from said fixed component and means for separating said hulling breast from said ginning breast, both said means being mutually so constructed as, in cooperation with said guiding faces, to translate said plates untilted, from closed to open position.

13. Cotton gin comprising a fixed component including a saw cylinder, having laterally spaced fixed plates forming the sides of said component, upper and lower pairs of track bars extending forwardly from said fixed component, the track bars of at least one pair being fixed to the respective sides of said component, said track bars of each pair having parallel guiding faces, ginning and hulling breasts each including laterally spaced side plates, rollers slidably supporting said side plates independently of one another upon said guiding faces, the latter being rectilinear throughout the range of sliding movement of said breasts, latches at the top and bottom of said breasts positioned to couple them in closed relation, connecting means at the top and bottom of said gin on each side for connecting the corresponding side plates of said fixed component and ginning breast, each connecting means comprising a bell crank and a link the latter being pivotally connected at its respective ends to one arm of said bell crank and to the journal of the corresponding roller, shafts extending transversely through the fixed component upon which are respectively mounted the corresponding top and bottom bell cranks, means for interconnecting the top and bottom bell cranks on the respective sides of said fixed component, a hand lever at one side of the gin fixed to one of said shafts for simultaneous operation of all said top and bottom bell cranks, means for interconnecting the top and bottom latches at both sides of the breasts for simultaneous operation, comprising connecting rods slidably mounted on the side plates of the hulling breast, one on each side, each being loosely coupled at upper and lower ends to corresponding latches, a lug intermediately mounted on each rod, a compression spring on each rod for yieldably supporting said lugs, a cam shaft extending transversely through said hulling breast, cams in the same phase of circumferential displacement carried thereby positioned to engage corresponding lugs for depressing the rods to release said latches, crank arms and an operating handle carried by said cam shaft, rigid links at the opposite sides of said gin connecting said breasts, each having a slot at one end and being pivotally connected at the other end to the corresponding crank arm studs mounted on the opposite side plates of the ginning breast to which said links are connected through said slots with lost motion, the lost motion creating a lag in the thrust of said links relative to the latch releasing movement of said connecting rods causing the effective functioning of said rods in releasing and engaging said latches takes place during the lost motion periods of movement of said links.

14. Cotton gin comprising a fixed component including a saw cylinder, laterally spaced parallel plates forming the sides of said component, parallel track bars extending forwardly and rearwardly from the side plates of said fixed component and fixed thereto, said gin including also movable components comprising ginning and hulling breasts having spaced parallel side plates slidably supported upon the forwardly extending track bars, and a chamber for supplying air under pressure to said gin slidably supported upon the rearwardly extending track bars, the components of said gin when in operative position being in a substantially contiguous serial train, and being relatively separable serially, upon occasion, through rectilinear traverse of the movable components upon the track bars, said chamber including a forward face formed with a nozzle extending substantially thereacross substantially the length of the saw cylinder, means forming a mote duct carried by said pressure chamber at the top of said chamber, having a transverse mouth parallel to said nozzle the latter being so shaped as to direct an air blast from said chamber toward the mouth of said mote duct.

15. Cotton gin comprising a fixed component including a saw cylinder having laterally spaced plates forming the sides of said component, upper and lower pairs of track bars extending forwardly from said fixed component, the track bars of at least one pair being fixed to the respective sides of said component, the track bars of each pair including parallel guiding faces, ginning and hulling breasts each including laterally spaced side plates, the side plates of the respective breasts being independently slidably supported by said guiding faces, the latter being rectilinear throughout the range of sliding movement of the breasts, the side plates of said fixed component and of said breasts being serially contiguous when said breasts are in operative position with respect to said saw cylinder, latches for holding said breasts together whereby they are movable as a unit along said track bars, separating means positioned to act between said ginning and hulling breasts for opening and closing them, including links connecting the side plates of said breasts, upper and lower latch operating means connecting said latches to simultaneously open and close them, said breast separating means having portions thereof positioned in such operative relation to said latch operating means as to actuate the latter to open and close said latches respectively in the initial part of the breast separating movement and the final part of the breast closing movement.

16. Cotton gin comprising a fixed component including a saw cylinder, and ginning and hulling breasts including respectively, ginning and hulling ribs, said fixed component and each of said breasts including spaced parallel side plates in vertical planes serially disposed to form the opposite sides of the gin, parallel track bars having rectilinear guiding faces, fixed to the side plates of the fixed component at high and low level, extending forwardly, flanged rollers mounted on the side plates of both of said breasts, independently supporting said breasts upon said guiding faces without lateral play, said breasts being unitarily separable from said fixed component and separable from one another, stub shafts extending outwardly from the side plates of said breasts perpendicularly thereto affording axes for said rollers, the latter being slidable with respect to said stub shafts, means for adjusting said breasts laterally relative to the fixed component for adjusting the saw clearance between said ribs and saw cylinder comprising a sleeve on each stub shaft at one side of the breasts, keyed to the stub shaft with limited sliding movement relative thereto, the corresponding roller being non-slidably journalled on said sleeve, the outer end of said sleeve being threaded, and an adjusting nut screwed freely on said threaded end and rotatably mounted on the stub shaft, said sleeve and nut forming a couple of adjustable length which reacts between said stub shaft and roller when the nut is turned, moving said breasts laterally within the limits set by the keyed connection between said sleeve and stub shaft.

References Cited by the Examiner

UNITED STATES PATENTS

| | | | |
|---|---|---|---|
| 314,748 | 3/85 | Strong | 19—63 |
| 354,955 | 12/86 | Valk | 19—63 |
| 1,010,732 | 12/11 | Dickson | 19—59 |
| 1,136,969 | 4/15 | Moore | 19—59 |
| 1,904,637 | 4/33 | Wallace | 19—55 |
| 1,934,575 | 11/33 | Wallace | 19—63 |
| 2,087,498 | 7/37 | Blewett | 19—55 |
| 2,137,744 | 11/38 | Streun | 19—55 |
| 2,155,181 | 4/39 | Deems | 19—55 |
| 2,181,091 | 11/39 | McLean | 19—63 |
| 2,188,826 | 1/40 | Wallace | 19—55 |
| 2,234,429 | 3/41 | Deems | 19—55 |

RUSSELL C. MADER, *Primary Examiner.*

MERVIN STEIN, DONALD W. PARKER, *Examiners.*